May 24, 1966  A. K. SPARKS  3,253,045
PROCESS FOR THE PREPARATION OF P-NITROHALOBENZENES
Filed Nov. 12, 1964
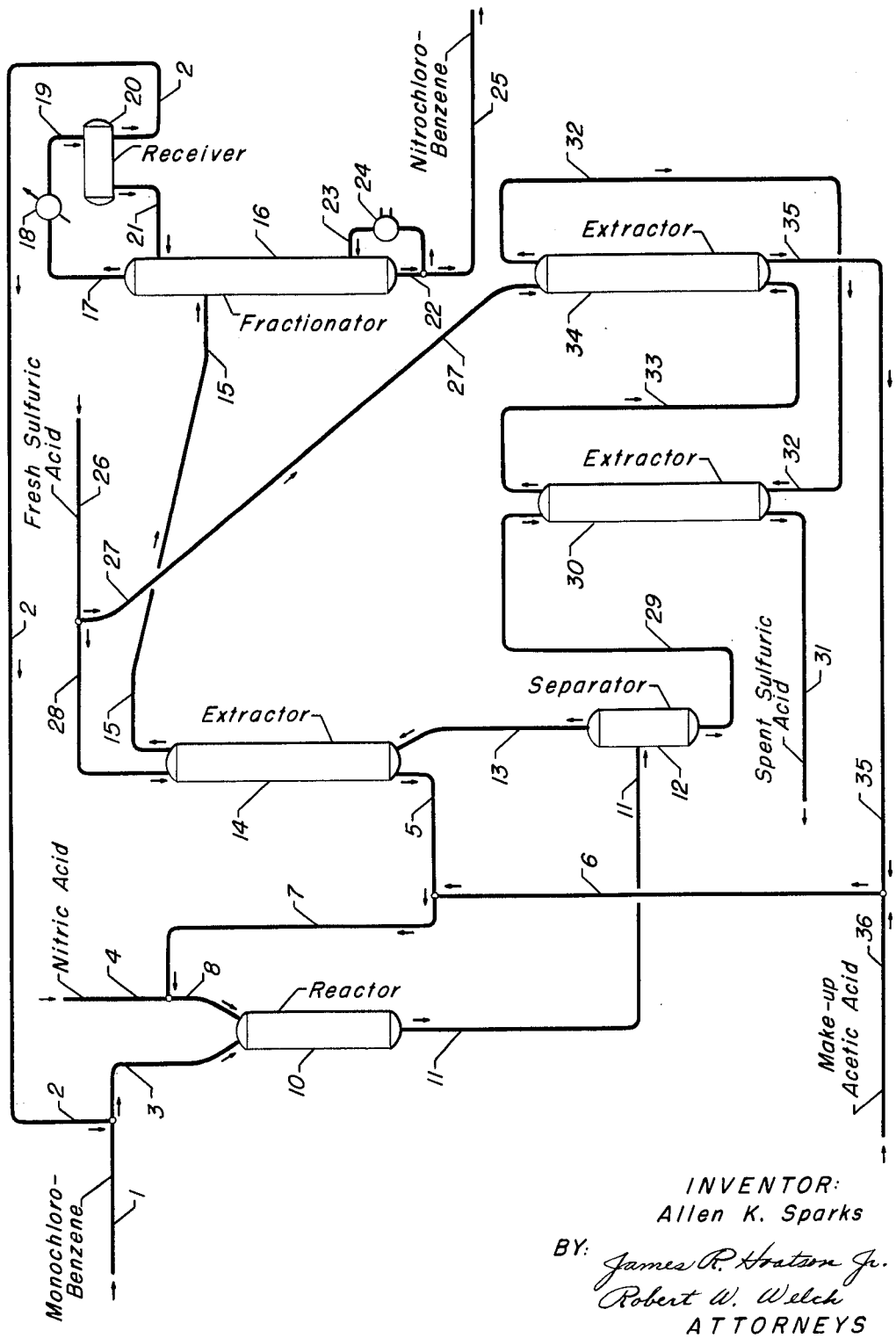
INVENTOR:
Allen K. Sparks
BY: James R. Hratson Jr.
Robert W. Welch
ATTORNEYS United States Patent Office 3,253,045
Patented May 24, 1966

3,253,045
PROCESS FOR THE PREPARATION OF
p-NITROHALOBENZENES
Allen K. Sparks, Des Plaines, Ill., assignor to Universal Oil Products Company, Des Plaines, Ill., a corporation of Delaware
Filed Nov. 12, 1964, Ser. No. 410,663
13 Claims. (Cl. 260—646)

This application is a continuation-in-part of my copending application, Serial No, 255,183, filed January 31, 1963, now U.S. Pat. No. 3,180,900.

This invention relates to a continuous process for the nitration of halobenzenes. More specifically this invention relates to a process of economically increasing the amount of the para isomer in a nitrohalobenzene nitration product by maintaining the presence of a carboxylic acid during the nitration step and recovering substantially all of said carboxylic acid for subsequent reuse.

Nitrohalobenzenes are in general valuable chemical intermediates in the production of dyes, and also in the production of inhibitors or antiozonants for rubber, gasoline, and the like. In many cases, products prepared from the para isomer of a nitrohalobenzene possess superior qualities with respect to their intended application. For example, it is known that N-phenyl-N'-cyclohexyl-p-phenylenediamine is a particularly effective antiozonant for rubber. The preparation of this highly useful compound is initially dependent upon the preparation of p-nitrochlorobenzene—a product of the process of this invention—which, upon condensation with aniline, followed by reductive alkylation with cyclohexanone, is converted to the desired N-phenyl-N'-cyclohexyl-p-phenylenediamine.

In one of its broad aspects, it is an object of this invention to disclose a process for economically increasing the amount of the para isomer in a nitrohalogenzene nitration product by contacting a halobenzene with nitric acid in the presence of sulfuric acid and a carboxylic acid in a reaction zone and recovering the carboxylic acid for reuse from the reaction zone effluent by extraction.

It is an object of this invention to recover the carboxylic acid from the reaction zone effluent by means of extraction steps and return the recovered carboxylic acid back to the reaction zone.

It is another object of this invention to utilize the incoming fresh sulfuric acid to extract the carboxylic acid out of the reaction zone effluent organic phase.

It is a more specific object of this invention to disclose a continuous process for the production of p-nitrochlorobenzene by reaction of monochlorobenzene with nitric acid in an acetic acid solution of sulfuric acid and recovery of the acetic acid by extraction of the effluent streams and returning the recovered acetic acid to the reaction zone.

Other objects of the present invention will become more readily apparent in the light of the following detailed specification.

The reactions of the process of this invention finds specific utility with respect to nitratable halobenzenes subject to the ortho-para directing influence of the halo substituent, or substituents wherein a position para to the halo substituent, and at least one position ortho thereto, are open to nitration. The present process of this invention is particularly applicable to the nitration of monohalobenzenes, i.e., chlorobenzene, bromobenzene, fluorobenzene and iodobenzene. It is contemplated that the reaction zone conditions are such that the ortho directing influence of the halo substituent is inhibited and thereby effects an increase in the amount of para isomer in the nitrohalobenzene nitration product, the para position being open to nitration. For example, in the nitration of 1,2-dichlorobenzene, substitution on the aromatic nucleus is inhibited in a position ortho to either of the chloro substituents so that nitration occurs principally in a position para to either of the chloro substituents to give primarily a 1,2-dichloro-4-nitrobenzene nitration product. The reaction of this process is thus further applicable to the nitration of dihalobenzenes, including 1,2-dibromobenzene, 1,2-difluorobenzene, 1,2-diiodobenzene, etc., and also trihalobenzenes including 1,2,3-trichlorobenzene, 1,2,3-tribromobenzene, etc. and likewise to mixed halo substituents such as 1-chloro-2-bromobenzene, etc.

The reaction zone in the process of this invention is maintained such that a nitratable halobenzene is nitrated with nitric acid in the presence of both sulfuric acid and a carboxylic acid. The carboxylic acid is preferably selected from the group consisting of alkanecarboxylic acid, dibasic alkanecarboxylic acid and cycloalkanecarboxylic acid. The carboxylic acids which may be utilized are those which act as a mutual solvent for nitric and sulfuric acids at nitration reaction conditions while remaining substantially inert to the oxidizing effect of nitric acid. In general alkanecarboxylic acids containing from about 2 to about 10 carbon atoms are suitable. The normal or straight chain alkanecarboxylic acids, for example, acetic acid, propionic acid, butyric acid, valeric acid, caproic acid, caprylic acid, pelargonic acid, capric acid, etc. are preferred. However, the various structural isomers of the aforesaid acids are also operable although not necessarily with the same or equivalent results.

When a mole of a nitratable halobenzene such as chlorobenzene is nitrated with nitric acid, a mole of water is evolved. Since the evolved water will dilute the nitric acid thus inhibiting further nitration of the halobenzene, sulfuric acid is utilized to absorb the evolved water while also speeding up the nitration reaction. When a mixed acid system of nitric and sulfuric acid is utilized to nitrate a halobenzene such as chlorobenzene the normal isomer distribution is about 65% para and about 35% ortho in the nitrohalobenzene nitration product. When the nitration takes place in a carboxylic acid solution of sulfuric acid the isomer distribution is substantially immediately shifted in favor of the para isomer although said solution comprises less than about 10 mole percent sulfuric acid. In general, a suitable yield of nitrohalobenzene nitration product, containing a substantial increase in the amount of para isomer therein, is effected in a solution of a carboxylic acid and sulfuric acid wherein said solution has a mole ratio of sulfuric acid to carboxylic acid of from about 1:4 to about 6:1.

It is apparent that since there is no consumption of carboxylic acid it is economically sound to recover the carboxylic acid in order to continually reuse it and the process of this invention provides a system for conveniently and economically separating the carboxylic acid from the nitration reaction products and recycling said acid to the reaction zone. One preferable embodiment is shown in the attached drawing which is a flow diagram of a process for producing nitrochlorobenzene having a high para isomer distribution. In this embodiment acetic acid is utilized as the carboxylic acid although other carboxylic acids as well as other halobenzenes may be utilized to achieve equivalent results.

Referring to the drawing fresh monochlorobenzene is introduced into flow conduit 1 where it mixes with recycled unconverted monochlorobenzene flowing in flow conduit 2 from a source hereinafter described and the combined mixture flows into flow conduit 3 and finally into reactor 10. Fresh nitric acid is introduced into the process through flow conduit 4 where it joins the sulfuric acid containing acetic acid flowing in flow conduit 7 and the resulting mixture flows into flow conduit 8 inside reactor 10 where the nitration of monochlorobenzene occurs. The nitration product leaves reactor 10 through flow conduit 11 and is introduced into separator 12.

The organic phase is withdrawn from the upper portion of separator 12 through flow conduit 13 where it flows into extractor 14. Fresh sulfuric acid is introduced into flow conduit 26 where a portion flows through flow conduit 28 and into extractor 14 (preferably countercurrent to the organic phase). The acetic acid in the organic phase is extracted out of said organic phase and into the fresh sulfuric acid phase by virtue of the contact between said phases in extractor 14. The enriched sulfuric acid containing a substantial portion of the acetic acid leaves extractor 14 through flow conduit 5 where it flows into flow conduit 7 and eventually back to the reactor. The organic phase leaves extractor 14 through flow conduit 15 where it flows into fractionator 16. The overhead fraction is withdrawn through flow conduit 17, cooler 18, flow conduit 19 and finally flows into overhead receiver 20. A portion of the overhead fraction is returned to fractionator 16 through flow conduit 21 as reflux. The net overhead fraction is withdrawn through flow conduit 2 where it may be withdrawn from the system or preferably it may be recycled back to reactor 10 as shown in the diagram. This overhead fraction will contain any unconverted monochlorobenzene and any remaining acetic acid. The bottom fraction leaves fractionator 16 through flow conduit 22 where a portion of the bottoms flows through flow conduit 23, heater 24 and thereupon returns to column 16. The net bottoms is withdrawn through flow conduit 25 and comprises the desired nitrochlorobenzene product.

The spent acid phase is withdrawn from the lower portion of separator 12 through flow conduit 29 where it flows into extractor 30. Lean solvent from a source hereinafter described flows through flow conduit 32 and into extractor 30 (preferably countercurrent to the spent acid phase) at such a rate as to extract a substantial portion of the acetic acid out of the spent acid phase and into the solvent phase. The extracted spent acid phase is withdrawn from extractor 30 through flow conduit 31 where it may either be slopped or regenerated in equipment not shown and returned to the process for subsequent reuse. The rich solvent containing acetic acid leaves extractor 30 through flow conduit 33 where it flows into extractor 34. The remaining portion of the fresh sulfuric acid flowing in flow conduit 26 enters flow conduit 27 and flows into extractor 34 (preferably countercurrent to the rich solvent) wherein the acetic acid is extracted out of the solvent phase and into the fresh sulfuric acid phase. The fresh sulfuric acid phase containing acetic acid leaves extractor 34 through flow conduit 35 where it flows into flow conduit 6 and eventually into reactor 10. Since a small amount of acetic acid is lost in the spent sulfuric acid leaving in flow conduit 31, additional acetic acid may be added to the system periodically through flow conduit 36. The extracted solvent (lean solvent) leaves extractor 34 through flow conduit 32 where it is returned to extractor 30 as hereinbefore described.

Other variations in the basic flow scheme are intended to be within the scope of this invention. For example, extractor 14 is omitted entirely and the organic phase is sent directly to the fractionator where the acetic acid and unconverted monochlorobenzene present in the net overhead fraction are recycled directly back to the reactor while the entire fresh sulfuric acid is sent to extractor 34 to recover the acetic acid from the rich solvent. In both cases the selection of the solvent is important and said solvent should have the characteristic of being more selective for acetic acid when the sulfuric acid contains a greater quantity of water. Since the most significant difference between the fresh and spent sulfuric acid is the water content, the solvent must remove the acetic acid from the relatively wet sulfuric acid and must release the acetic acid to the dry sulfuric acid. Preferable solvents comprise halobenzenes, nitrohalobenzenes and mixtures thereof. Especially preferable solvents comprise monochlorobenzene, nitrochlorobenzene and mixtures thereof.

Still other variations on the basic flow scheme are feasible such as using the extracted organic phase as the solvent. This concept can be readily accomplished by taking a portion of the extracted organic phase flowing in flow conduit 15 and introducing said portion into flow conduit 32 to extract the acetic acid from the spent sulfuric acid. The acetic acid-rich portion is then returned to flow conduit 13 and joins the reactor effluent organic phase entering extractor 14. In this manner extractor 34 would no longer be necessary although the total organic material flowing through extractor 14 will increase due to the recycled organic material. The remaining portion of the organic material flowing in flow conduit 15 is sent to fractionator 16 as shown in the diagram.

Although the reaction may be carried out in the vapor phase, it is preferable to maintain a liquid phase reactor and the temperature-pressure employed therein should be selected to maintain liquid phase. If atmospheric pressure is employed then the highest temperature suitable is about 118° C., the boiling point of acetic acid. As the pressure is increased the highest suitable temperature also increases. Generally pressures of from about atmospheric to about 1000 p.s.i.g. and temperatures of from about 25° C. to about 450° C. are suitable reactor conditions. The reaction has an inverse time-temperature relationship that is the higher the reactor temperature is the lower the required contact time to complete the reaction. Thus at atmospheric pressure and 25° C., the reaction is not completed after 3 hours whereas as the temperature is increased the required time is decreased. The reactor is designed to insure thorough mixing of the reactants and to provide sufficient residence time to allow the reaction to be completed for the particular temperature maintained in the reactor. The presence of the carboxylic acid slows the nitration reaction but also permits the selective para nitration reaction to occur. Thus the concentration of carboxylic acid is another variable to be considered in designing the residence time in the reactor.

Conventional processing equipment such as control valves, heat exchangers, heaters, coolers, instrumentation, etc., are not shown in the drawing since the selection of this equipment is within the skill of a process engineer and adds nothing to the inventive concept of the present process. Such equipment must, of course, be included in the process in order that it may function as hereinbefore described.

The following examples are presented to further illustrate the process of this invention and not to limit the scope of those reactants and conditions specifically shown therein.

*Example I*

This example is presented to illustrate conventional isomer distribution of a nitrohalobenzene nitration product obtained in a carboxylic acid medium and in the absence of sulfuric acid. Over a period of about 1.5 hours, 17.5 grams of 90% nitric acid was added to a stirred mixture comprising 56.2 grams of chlorobenzene and 75 grams of acetic acid. The temperature was maintained at about 25° C. After a total reaction time of approximately 3 hours had elapsed, the reaction mixture was poured over crushed ice and neutralized with 20% sodium hydroxide solution. The resulting aqueous layer was separated from the organic layer and extracted about 4 times with benzene. The benzene extract was then combined with the organic layer and dried over anhydrous sodium sulfate. After separation of the benzene by distillation, the remainder of the reaction mixture was analyzed by gas-liquid chromatography methods. The yield of nitrochlorobenzene product based on the quantity of nitric acid charged was only about 1% of which about 67% was the para isomer and about 33% was the ortho isomer.

Example II

This example is presented to illustrate the isomer distribution of a nitrohalobenzene product derived through conventional methods of nitration using a nitric acid sulfuric acid nitrating mixture in the absence of a carboxylic acid. Over a period of about 1.5 hours, 17.5 grams of 90% nitric acid was added to a stirred mixture comprising 56.2 grams of chlorobenzene and 51 grams of 96% sulfuric acid. The temperature was maintained at about 25° C. After a total reaction time of about 3 hours, the reaction mixture was poured over crushed ice neutralized with 20% sodium hydroxide solution and further treated as described in Example I. The yield of nitrochlorobenzene in this case amounted to about a 90% yield based upon the quantity of nitric acid charged of which about 65.3% was the para isomer and about 34.6% the ortho isomer and about 0.1% the meta isomer.

Example III 61 grams of 96% sulfuric was added slowly and with cooling to a stirred solution comprising about 56.2 grams of chlorobenzene and 75 grams of acetic acid. Thereafter, and over a period of about 1.5 hours, 17.5 grams of 90% nitric acid was added with stirring while maintaining the reaction mixture at about 25° C. After a total reaction time of about 3 hours had elapsed, the reaction mixture was poured over crushed ice, neutralized with 20% sodium hydroxide solution and further treated as described in Example I. The yield of nitrochlorobenzene was about 95% based on the quantity of nitric acid charged. There was an increase in para isomer to about 74.2% a corresponding decrease in the ortho isomer to about 25.5% and about 0.4% meta isomer. Substantially all of the acetic acid was recovered.

Example IV

About 837 grams of charge composed of 225 grams of chlorobenzene, 127 grams of nitric acid (100%), 245 grams of sulfuric acid (96%) and 240 grams of glacial acetic acid are introduced into a reactor at a temperature of 25° C. After 3 hours an effluent is withdrawn from the reactor and separated into an acid layer of about 532 grams and an organic layer of about 305 grams. The concentration of nitrochlorobenzene in the organic phase is about 83% and the concentration of acetic acid in the organic phase is about 8%. The ratio of para isomer to ortho isomer of the nitrochlorobenzene is about 75 to 25.

Example V

A charge composed of 16.2 grams of sulfuric acid, 0.8 grams of water, 20.0 grams of acetic acid, 18.7 grams of monochlorobenzene and 26.2 grams of nitrochlorobenzene is thoroughly mixed at 23° C. and allowed to separate into an acid phase and an organic phase. The acid phase which comprises 15.1 grams sulfuric acid, 0.8 grams of water, 17.3 grams of acetic acid and less than 2 grams of both monochlorobenzene and nitrochlorobenzene is thoroughly mixed with 63.8 grams of monochlorobenzene at 23° C. The resulting mixture is separated and 2.2 grams of acetic acid is found in the resulting organic layer.

The first mentioned organic phase which comprises 2.6 grams of acetic acid, about 17 grams of monochlorobenzene and about 24 grams of nitrochlorobenzene is thoroughly mixed with 4.4 grams of 95% sulfuric acid. The resulting mixture is separated and 1.92 grams of acetic acid is found in the resulting acid layer.

Example VI

A charge composed of 16.2 grams of sulfuric acid, 3.3 grams of water, 20.0 grams of acetic acid, 18.7 grams of monochlorobenzene and 26.2 grams of nitrochlorobenzene is thoroughly mixed at 23° C. and allowed to separate into an acid phase and an organic phase. The acid phase which comprises 15.4 grams of sulfuric acid, 3.3 grams of water, 16.3 grams of acetic acid and less than 1 gram of both monochlorobenzene and nitrochlorobenzene is thoroughly mixed with 53.8 grams of monochlorobenzene at 23° C. The resulting mixture is separated and 2.8 grams of acetic acid is found in the resulting organic layer.

The first mentioned organic phase which comprises 3.7 grams of acetic acid, about 19 grams of monochlorobenzene and about 26 grams of nitrochlorobenzene is thoroughly mixed with 4.3 grams of 95% sulfuric acid. The resulting mixture is separated and 3.2 grams of acetic acid is found in the resulting acid layer.

Example VII

A charge composed of 16.2 grams of sulfuric acid, 7.1 grams of water, 19.7 grams of acetic acid, 18.7 grams of monochlorobenzene and 25.9 grams of nitrochlorobenzene is thoroughly mixed at 23° C. and allowed to separate into an acid phase and an organic phase. The acid phase, which comprises 15.8 grams of sulfuric acid, 7.1 grams of water and 13.7 grams of acetic acid is thoroughly mixed with 52.2 grams of monochlorobenzene at 23° C. The resulting mixture is separated and 3.9 grams of acetic acid is found in the resulting organic layer.

The first mentioned organic phase which comprises 5.8 grams of acetic acid, about 19 grams of monochlorobenzene and about 26 grams of nitrochlorobenzene is thoroughly mixed with 3.3 grams of 95% sulfuric acid. The resulting mixture is separated and 3.1 grams of acetic acid is found in the resulting acid layer.

Distribution coefficients are calculated from the results of Examples V through VII and are summarized in Table 1 hereinafter presented. It is apparent that the organic phase is capable of extracting increased amounts of acetic acid out of sulfuric acid as the water concentration increases thus showing the feasibility of extracting the carboxylic acid out of the spent sulfuric acid (high in water) and in turn extracting the carboxylic acid out of the organic phase with relatively dry sulfuric acid.

TABLE 1

| Acid Phase | Acid Concentration,[1] percent | Organic Material | Temp., °C. | K[2] |
|---|---|---|---|---|
| $H_2SO_4$ | 95 | Monochlorobenzene | 23 | 29.5 |
| $H_2SO_4$ | 83 | ----do---- | 23 | 16.3 |
| $H_2SO_4$ | 70 | ----do---- | 23 | 8.6 |

[1] Wt. $H_2SO_4$/Wt. $H_2SO_4$+Wt. $H_2O$.
[2] K is the distribution of acetic acid by weight between equal weights of sulfuric acid (100% basis) and the organic.

I claim as my invention:
1. A process for the enhanced production of the para isomer of a nitrohalobenzene which comprises:
   introducing a halobenzene into contact with nitric acid in the presence of sulfuric acid and an alkane carboxylic acid containing from 2 to 10 carbon atoms per molecule in a reactor,
   separating the reactor effluent into an organic phase and an acid phase,
   contacting the organic phase with a portion of fresh sulfuric acid thereby extracting the carboxylic acid out of the organic phase and into the sulfuric acid phase and returning the sulfuric acid phase to said reactor,
   contacting the acid phase with a solvent thereby extracting the carboxylic acid out of the acid phase and into the solvent phase,
   contacting the solvent containing the extracted carboxylic acid with the other portion of fresh sulfuric acid thereby extracting the carboxylic acid out of the solvent and into the sulfuric acid phase and returning the sulfuric acid phase to said reactor.

2. A process for the enhanced production of the para isomer of a nitrohalobenzene which comprises:
introducing a halobenzene into contact with nitric acid in the presence of sulfuric acid and an alkane carboxylic acid containing from 2 to 10 carbon atoms per molecule in a reactor,
separating the reactor effluent into an organic phase and an acid phase,
contacting the organic phase with fresh sulfuric acid in a first extraction zone thereby extracting the carboxylic acid out of the organic phase and into the sulfuric acid phase and returning the sulfuric acid phase to said reactor,
introducing a portion of the extracted organic phase into contact with said acid phase in a second extraction zone thereby extracting the carboxylic acid out of the acid phase and into the organic phase and returning the organic phase to said first extraction zone,
and withdrawing the remaining portion of the extracted organic phase.

3. In a process for the enhanced production of the para isomer of a nitrohalobenzene in which an alkane carboxylic acid containing from 2 to 10 carbon atoms per molecule is utilized to promote the para forming nitration of a halobenzene in a mixed nitric-sulfuric acid reaction zone, an improvement which comprises extracting a portion of the carboxylic acid in the effluent organic phase with fresh sulfuric acid, extracting the remaining portion of the carboxylic acid in the effluent acid phase with a solvent, thereupon separating the solvent from the extracted carboxylic acid and returning both extracted portions of carboxylic acid to the reaction zone.

4. A process for the enhanced production of the para isomer of a nitrohalobenzene which comprises:
introducing a halobenzene into contact with nitric acid in the presence of both sulfuric acid and an alkane carboxylic acid containing from 2 to 10 carbon atoms per molecule in a reactor,
separating the reactor effluent into an organic phase and an acid phase,
contacting the organic phase with a portion of fresh sulfuric acid thereby extracting the carboxylic acid out of the organic phase and into the sulfuric acid phase and returning the sulfuric acid phase to said reactor,
introducing the extracted organic phase into a fractionating tower and separating the nitrohalobenzene from the unconverted halobenzene,
returning said unconverted halobenzene to said reactor,
contacting the acid phase with a solvent thereby extracting the carboxylic acid out of the acid phase and into the solvent phase,
contacting the solvent containing the extracted carboxylic with the other portion of fresh sulfuric acid thereby extracting the carboxylic acid out of the solvent and into the sulfuric acid phase and returning the sulfuric acid phase to said reactor.

5. A process for the enhanced production of the para isomer of a nitrohalobenzene which comprises:
introducing a halobenzene into contact with nitric acid in the presence of sulfuric acid and an alkane carboxylic acid containing from 2 to 10 carbon atoms per molecule into the inlet of a reaction zone,
separating the reaction effluent into an organic phase and an acid phase,
introducing the organic phase into contact with fresh sulfuric acid in a first extraction zone thereby extracting the carboxylic acid out of the organic phase and into the sulfuric acid phase and returning said sulfuric acid phase to the inlet of the reaction zone,
introducing a portion of the extracted organic phase into contact with said acid phase in a second extraction zone thereby extracting the carboxylic acid out of the acid phase and into the organic phase and returning the organic phase containing the carboxylic acid to the first extraction zone,
introducing the remaining portion of the extracted organic phase into a fractionating column and withdrawing from the lower part of the column the desired nitrohalobenzene,
and returning the unconverted halobenzene from the upper part of the column to the inlet of said reaction zone.

6. The process of claim 4 further characterized in that the halobenzene is monochlorobenzene.

7. The process of claim 6 further characterized in that the carboxylic acid is acetic acid.

8. The process of claim 7 further characterized in that the solvent is monochlorobenzene, nitrochlorobenzene and mixtures thereof.

9. The process of claim 5 further characterized in that the halobenzene is monochlorobenzene.

10. The process of claim 9 further characterized in that the carboxylic acid is acetic acid.

11. The process of claim 4 further characterized in that the mole ratio of sulfuric acid to carboxylic acid lies between about 1 to 4 and about 6 to 1.

12. A process for the enhanced production of the para isomer of a nitrohalobenzene which comprises:
introducing a halobenzene into contact with nitric acid in the presence of sulfuric acid and an alkane carboxylic acid containing from 2 to 10 carbon atoms per molecule in a reactor,
separating the reactor effluent into an organic phase and an acid phase,
introducing the organic phase into a fractionating tower and separating the nitrohalobenzene from the unconverted halobenzene and the carboxylic acid,
returning the unconverted halobenzene and the carboxylic acid to said reactor,
contacting the acid phase with a solvent in a first extraction zone thereby extracting the carboxylic acid out of the acid phase and into the solvent phase,
contacting the solvent containing the extracted carboxylic acid with fresh sulfuric acid in a second extraction zone thereby extracting the carboxylic acid out of the solvent phase and into the fresh acid phase,
and returning said fresh acid phase to the reactor.

13. The process of claim 12 further characterized in that said carboxylic acid is acetic acid and said halobenzene is monochlorobenzene.

References Cited by the Examiner

Paul, J. Am. Chem. Soc., vol. 80, pages 5332 to 5333 (1958), QD 1 A5.

Topchiev, Nitration of Hydrocarbons and Other Organic Compounds, Pergamon Press Ltd. (England), 1959, pages 41 and 42 QD 305 H5T6.

LEON D. ROSDOL, *Primary Examiner.*

CARL D. QUARFORTH, *Examiner.*

L. A. SEBASTIAN, *Assistant Examiner.*